(12) United States Patent
Taylor

(10) Patent No.: US 11,003,059 B1
(45) Date of Patent: May 11, 2021

(54) DYNOGRAPH DEVICE

(71) Applicant: Rohan Taylor, Newark, NJ (US)

(72) Inventor: Rohan Taylor, Newark, NJ (US)

(\*) Notice: Subject to any disclaimer, the term of this patent is extended or adjusted under 35 U.S.C. 154(b) by 0 days.

(21) Appl. No.: 16/805,740

(22) Filed: Feb. 29, 2020

(51) Int. Cl.
*G03B 17/56* (2006.01)
*H04N 5/232* (2006.01)
*H04N 5/225* (2006.01)

(52) U.S. Cl.
CPC ......... *G03B 17/561* (2013.01); *H04N 5/2253* (2013.01); *H04N 5/23299* (2018.08)

(58) Field of Classification Search
None
See application file for complete search history.

(56) References Cited

U.S. PATENT DOCUMENTS

| | | | |
|---|---|---|---|
| 5,073,824 A | 12/1991 | Vertin | |
| 7,450,835 B2 | 11/2008 | Lackey et al. | |
| 9,213,220 B2 | 12/2015 | Fowler et al. | |
| 9,253,376 B2 | 2/2016 | Boyle et al. | |
| 9,458,963 B1 | 10/2016 | Choi et al. | |
| 9,465,278 B2 | 10/2016 | Lytle | |
| 9,800,769 B2 | 10/2017 | Taylor et al. | |
| 10,021,296 B2 | 7/2018 | Fan et al. | |
| 2006/0064273 A1 | 3/2006 | Sugiura et al. | |
| 2009/0317071 A1\* | 12/2009 | David | G03B 17/561 396/428 |
| 2010/0208130 A1\* | 8/2010 | Desorbo | H04N 5/23241 348/372 |
| 2016/0091780 A1\* | 3/2016 | Tiefenbrunn | F16M 11/14 396/419 |
| 2016/0349601 A1\* | 12/2016 | Kungl | H04N 5/23209 |
| 2017/0037994 A1\* | 2/2017 | Sakaguchi | F16M 11/045 |
| 2017/0160625 A1\* | 6/2017 | Bright | F16B 47/00 |
| 2017/0330346 A1\* | 11/2017 | Oshima | G03B 17/561 |
| 2018/0335684 A1\* | 11/2018 | Strauser | G08C 17/02 |
| 2019/0011811 A1\* | 1/2019 | Tiefenbrunn | G03B 17/561 |

\* cited by examiner

*Primary Examiner* — William B Perkey

(57) ABSTRACT

A Dynograph device for smoothing videos being taken is presented. The Dynograph device is a motorized camera tripod which interfaces an attached video camera to allow for automatic subject tracing. Upon initial observation, it appears as a conventional camera tripod with three extendable and adjustable legs. However, after closer inspection, it can be seen that the Dynograph device also provides motorized pan and tilt head that adjust the position of the attached video camera. This control module, powered by an attached battery or external power supply, uses smart logic to lock onto the movable portion of a video signal emanating from the video camera, such as a human presenter. Thus, as the person moves about the frame, the Dynograph device automatically adjusts the position of the video camera to keep the person within the same relative position. This movement is fluid and steady yielding finished videos that are on par with the best of professional films. The use of the Dynograph device provides the ability to automatically pan and rotate the video camera in a manner which is quick, easy and effective.

11 Claims, 6 Drawing Sheets

DYNOGRAPH DEVICE

FIELD OF THE INVENTION

This invention relates to video recording. More particularly, it relates to smoothing motion flow while video recording.

BACKGROUND

Video is an electronic medium for the recording, copying, playback, broadcasting, and display of moving visual media. Video was first developed for mechanical television systems, which were quickly replaced by cathode ray tube (CRT) systems which were later replaced by flat panel displays of several types.

Video systems vary in display resolution, aspect ratio, refresh rate, color capabilities and other qualities. Analog and digital variants exist and can be carried on a variety of media, including radio broadcast, magnetic tape, optical discs, computer files, and network streaming.

Many people who produce videos for use in training and for placing on internet or networking social media sites, such as Youtube®, use a tripod to hold their video cameras steady while shooting. The use of a tripod ensures that the picture remains steady and unlikely to cause motion sickness in any viewer.

Should the user wish to move about while shooting the video, another person with a steady and even hand is required to pan or rotate the camera. Even if another person is readily available to run the camera, no matter how hard one tries, the camera is likely to jerk resulting in less than fluid motion. Even if the camera movement is fluid, it is almost certain that the person will not remain in the center of the frame leading to less than ideal finished video even after editing.

Accordingly, in light of the foregoing, there exists a need for a device which a subject can be automatically tracked by a tripod mounted camera during a video recording in a fluid and centered manner and without a need for a videographer. The instant invention fulfills these and other undescribed shortcomings in the current industry.

DETAILED DESCRIPTION

Figure 2:
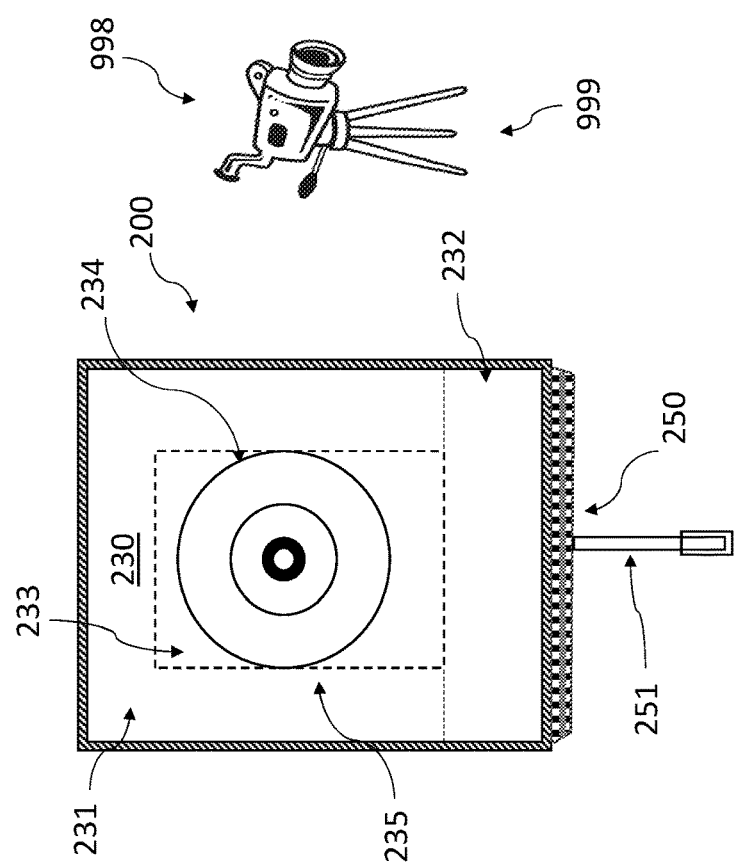
FIG. 2 is an illustrated bottom view of the exemplary Dynograph device shown in FIG. 1.

The phrases "in one embodiment," "in various embodiments," "in some embodiments," and the like are used repeatedly. Such phrases do not necessarily refer to the same embodiment. The terms "comprising," "having," and "including" are synonymous, unless the context dictates otherwise. Such terms do not generally signify a closed list.

"Above," "adhesive," "affixing," "any," "around," "both," "bottom," "by," "comprising," "consistent," "customized," "enclosing," "friction," "in," "labeled," "lower," "magnetic," "marked," "new," "nominal," "not," "of," "other," "outside," "outwardly," "particular," "permanently," "preventing," "raised," "respectively," "reversibly," "round," "square," "substantial," "supporting," "surrounded," "surrounding," "threaded," "to," "top," "using," "wherein," "with," or other such descriptors herein are used in their normal yes-or-no sense, not as terms of degree, unless context dictates otherwise.

Reference is now made in detail to the description of the embodiments as illustrated in the drawings. While embodiments are described in connection with the drawings and related descriptions, there is no intent to limit the scope to the embodiments disclosed herein. On the contrary, the intent is to cover all alternatives, modifications and equivalents. In alternate embodiments, additional devices, or combinations of illustrated devices, may be added to, or combined, without limiting the scope to the embodiments disclosed herein.

The following described Dynograph Device addresses these and other issues. The Dynograph Device which interfaces to an attached video camera allows for automatic subject tracking. Upon initial observation of the below described invention, it appears as a conventional camera tripod with three extendable and adjustable legs. However, after closer inspection, it can be seen that the present invention also provides for a motorized pan and tilt head that adjusts the position of the attached camera. These motors are controlled by an attached control module that utilizes a USB tether cord which connects to the output of the attached camera.

This control module, powered by an attached battery or external power supply, uses smart logic to lock onto the movable portion of the video signal such as the human presenter. Thus, as the person moves about the frame, the present invention automatically adjusts the position of the camera to keep the person within the same relative position. This movement is fluid and steady yielding finished videos that are on par with the best of professional films. Thus, use of the motorized tripod provides the ability to automatically pan and rotate a video camera in a manner which is quick, easy and effective.

Figure 1:
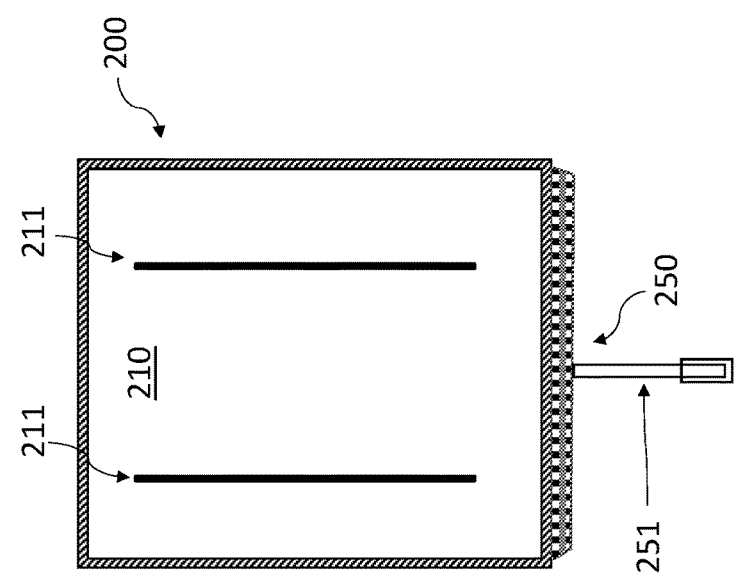
FIG. 1 is an illustrated top view of an exemplary Dynograph device.

Referring to FIG. 1 and FIG. 2, an illustrated top view of an exemplary Dynograph device 100 for stabilizing and smoothing the motion flow of a video recording is presented. The Dynograph device 100 is useful for providing better video quality of a moving image. The Dynograph device 100 is further useful for saving money by not having another person to produce recording and requires less time editing images because of rough image flow. Furthermore, the Dynograph device 100 provides for a more personalized recording by doing-it-yourself while providing high quality recordings. The Dynograph device 100 also allows for easier and higher quality recordings while in a subject is in motion.

Structural members of the Dynograph device 100 are preferably made of an aluminum material, however other materials are hereby contemplated, including, but not limited to, steel, stainless steel, aluminum, poly-vinyl chloride (PVC), etc. The Dynograph device 100 preferably has protective coatings applied to the material, thus providing a longer lasting device. Non-structural members of the Dynograph device 100 are preferably made of a plastic material in an injection molding process.

The Dynograph device 100 has a surface plate 200. The surface plate 200 has a top side 210, a bottom side 230 and a USB cable port 250. The top side 210 of surface plate 200 of the Dynograph device 100 has one or more grooves 211. The one or more groves 211 provide a connection point for coupling to a video camera 998.

The bottom side 230 of the surface plate 200 has a first area 231, a second area 232, a third area 233 and a mounting area 234. The mounting area 234 is configured to be significantly near a middle 235 of the bottom side 230 of the surface plate 200. The mounting area 234 is preferably a motorized section. The mounting area 234 is useful for being coupled to a tripod 999.

The second area 232 and the third area 233 having logic circuits. The logic circuits are useful for providing intelligence to detect and correct the video camera 998 by moving of the mounting area 234 and adjustment of the camera to smooth out any motion of the video camera 998.

The first area 231 is coupled to a video camera 998 or other device to provide intelligent adjustments in real time to smooth out the video recording.

The USB cable port 250 of the surface plate 200 further is coupled to a USB cable 251. The USB cable 251 is further coupled to the video camera 998 for feeding information to the video camera from the logic circuit of the second area 232 and the third area 233.

Figure 3:
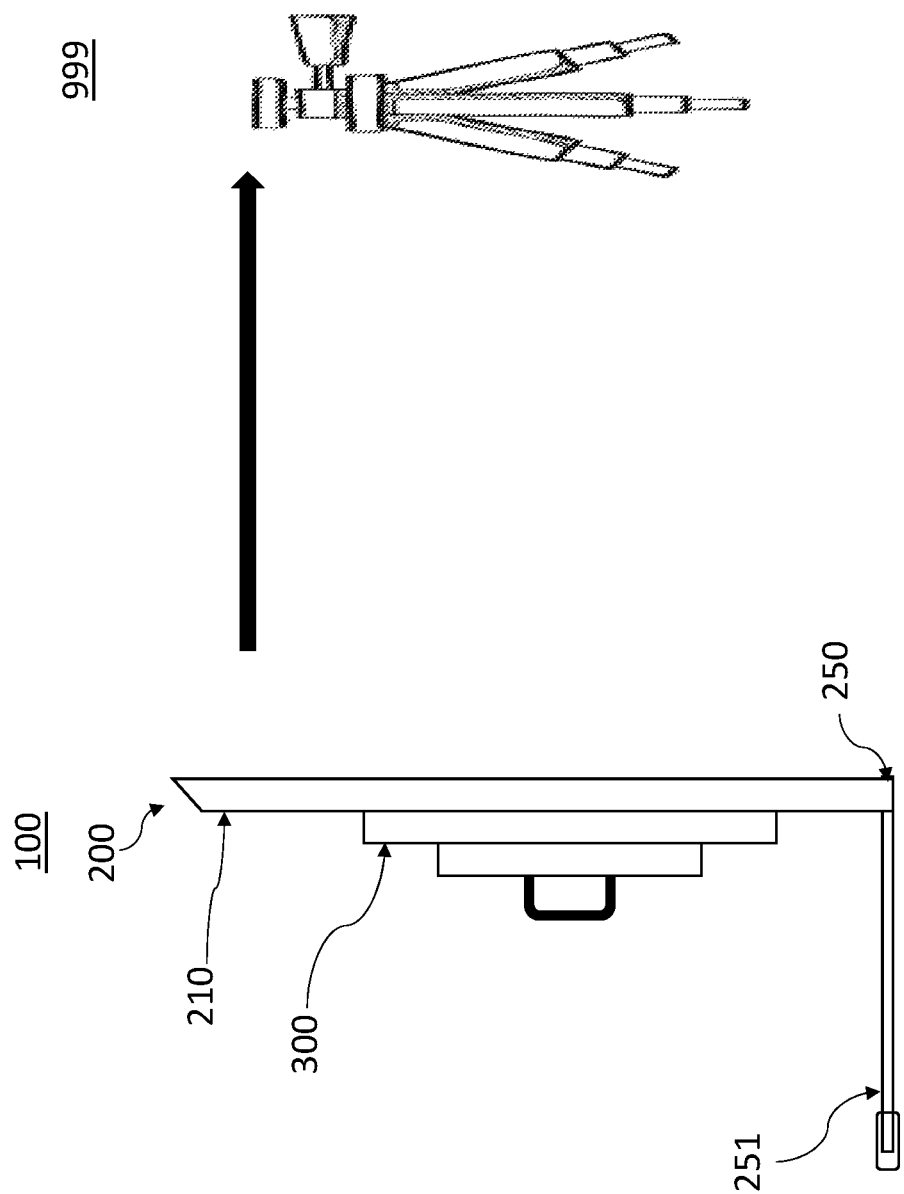
FIG. 3 is an illustrated side view of the exemplary Dynograph device shown in FIG. 1.

In FIG. 3, an illustrated view from a side view of the Dynograph device 100 is presented.

The top side 210 of the plate surface 200 is coupled to a mounting plate 300. The mounting plate 300 is coupled to a tripod 999 or a mounting mechanism. The USB cable 251 is coupled to a first end 201 of the plate surface 200.

Figure 4:
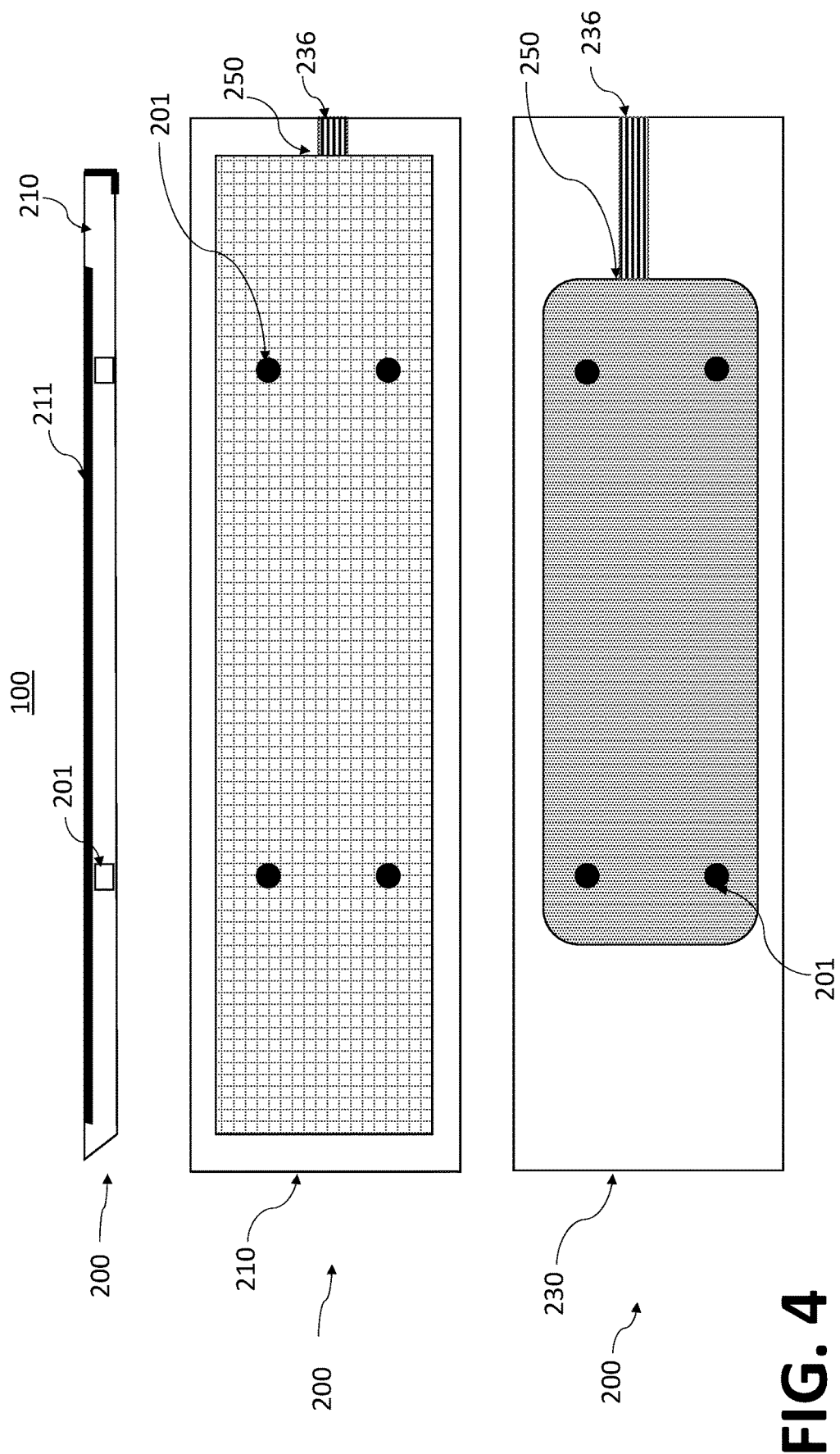
FIG. 4 is an illustrated view of an exemplary surface plate for the Dynograph device shown in FIG. 1.

Moving now to FIG. 4, an illustrated detailed view of an exemplary surface plate 200 for the Dynograph device 100 shown in FIG. 1 is presented.

The surface plate 200 has the top side 210 and the bottom side 230. The surface plate 200 further has the grooves 211 on the top side 210 of the surface plate 200 for attaching the video camera 998 (see FIG. 1). The top side 210 has a plurality of holes 201. The holes 201 preferably are sized to fit screws to couple the surface plate 200 to a circuit board 400 (shown in FIG. 5). The groves 211 of the top side 210 of the surface plate 200 couple the video camera 998 to the top side 210 of the surface plate 200.

The bottom side 230 of the surface plate 200 has the plurality of holes 201. The plurality of holes 201 align with receiving holes of the tripod 999 to securely couple the Dynograph device 100 to the tripod 999. The bottom side 230 of the surface plate 200 further has a cable area 236 to run the USB cable 251 to couple to the USB cable port 250.

Figure 5:
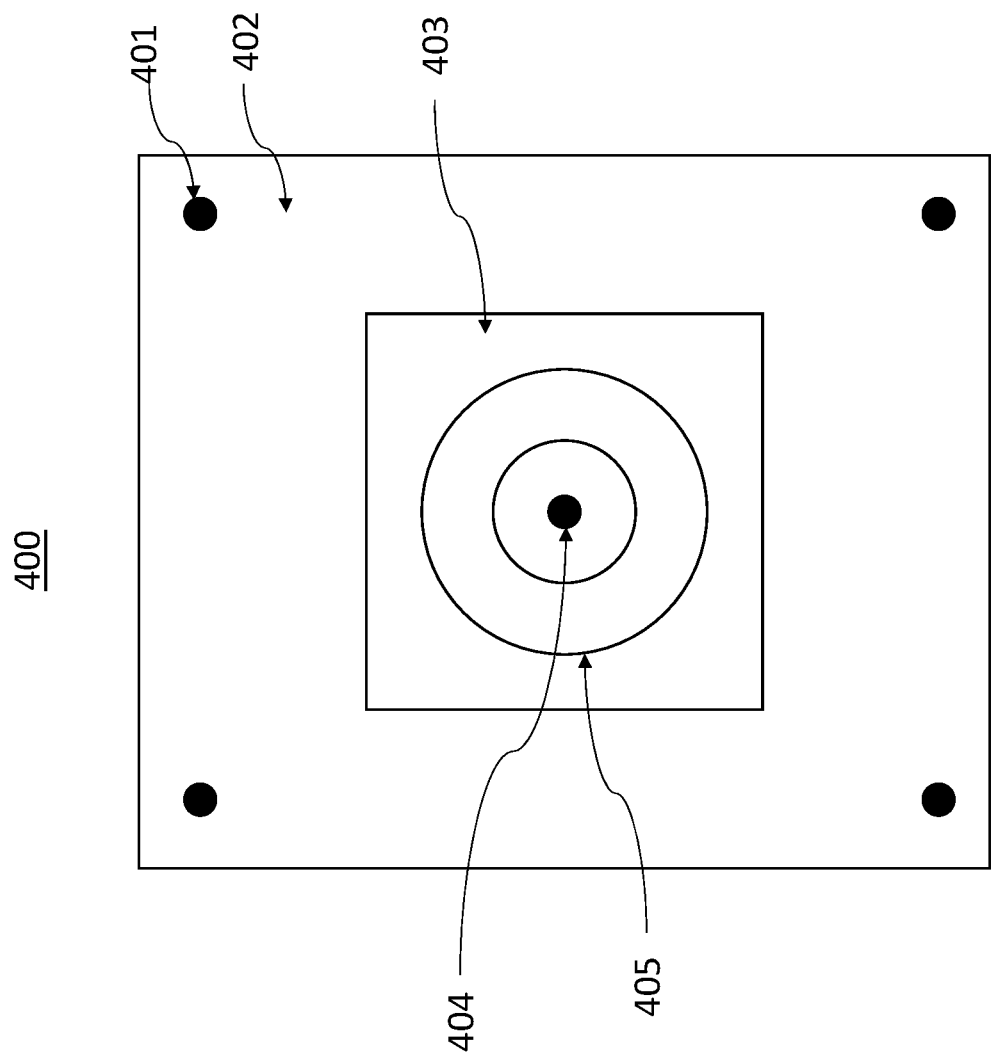
FIG. 5 is an illustrated view of an exemplary circuit board for the Dynograph device shown in FIG. 1.

Referring now to FIG. 5, an illustrated view of an exemplary circuit board 400 for the Dynograph device 100 shown in FIG. 1 is presented. The circuit board 400 determines movement and transfer information into actual motion via motors and gears.

The circuit board 400 has a plurality of holes 401, a logic area 402 and a motorized mechanics area 403. The plurality of holes 401 align with the plurality of holes 201 (shown in FIG. 4) of the surface plate 200. Preferably screws secure the circuit board 400 to the surface plate 200 at the plurality of holes 401 of the circuit board 400 and the plurality of holes 201 of the surface plate 200.

The logic area 402 contains the circuitry with logic. The logic area 402 locks onto images and tracks movements within a pre-determined specified parameter.

The motorized mechanics area 403 has motors 404 and gears 405 which move and adjust the coupled video camera 998 to optimize and smooth transitions of the output of the video captured by the video camera 998. The motors 404 preferably drive rotation for a specified angle, wherein the angle being between zero degree and three hundred degrees (0°-360°).

Figure 6:
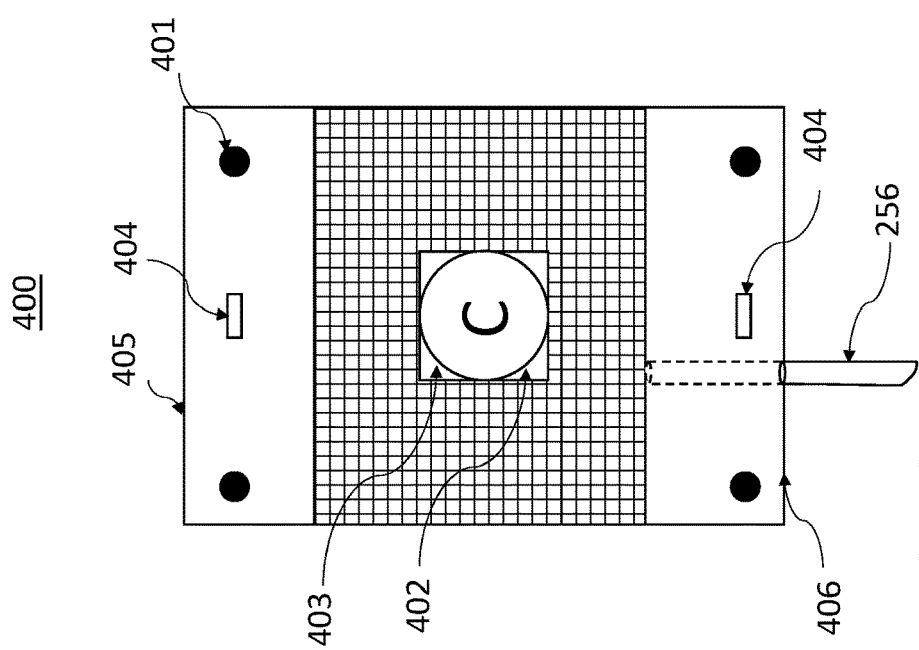
FIG. 6 is a detailed illustrated view of the circuit board shown in FIG. 5.

Moving now to FIG. 6, a detailed illustrated view of the circuit board shown in FIG. 5 is presented. The circuit board 400 determines movement and transfer information into actual motion via motors and gears.

The circuit board 400 has a plurality of holes 401, a logic area 402 and a motorized mechanics area 403. The plurality of holes 401 align with the plurality of holes 201 (shown in FIG. 4) of the surface plate 200. Preferably screws secure the circuit board 400 to the surface plate 200 at the plurality of holes 401 of the circuit board 400 and the plurality of holes 201 of the surface plate 200.

The logic area 402 contains the circuitry with logic. The logic area 402 locks onto images and tracks movements within a pre-determined specified parameter.

Further, the circuit board 400 has a plurality of connecting ports 404 for coupling tilt motors to the circuit board 400. The connecting ports 404 are preferably at a first end 405 and a second end 406 of the circuit board 400.

Figure 7:
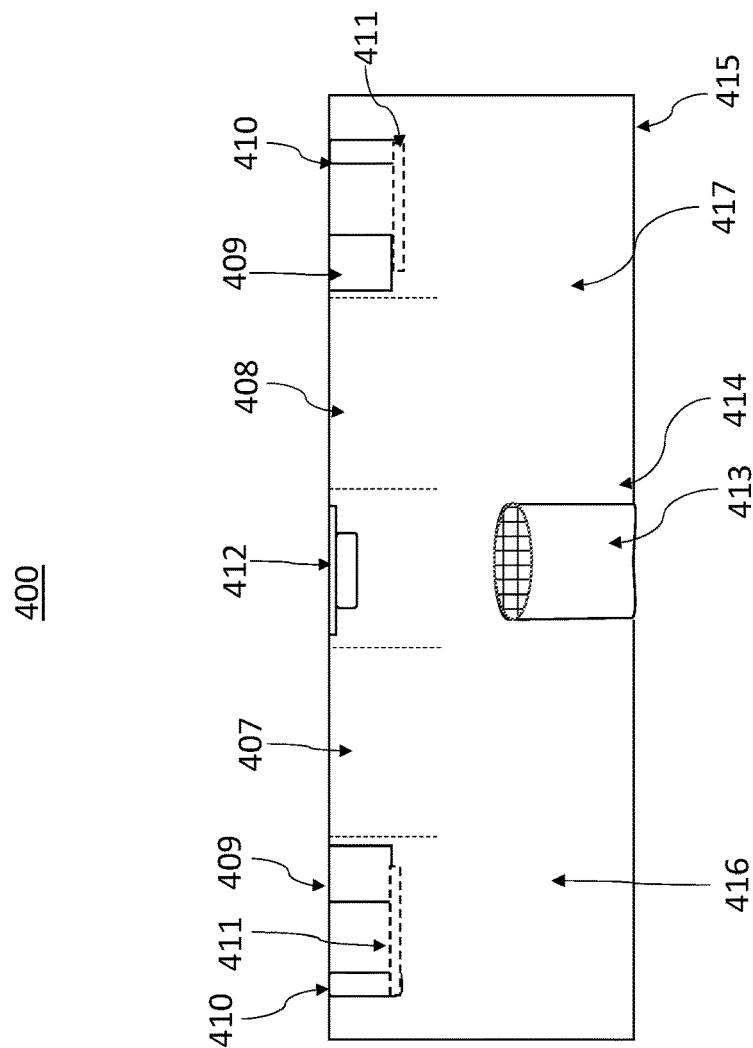
FIG. 7 is a further detailed illustrated view of the circuit board shown in FIG. 6.

Now in FIG. 7, a further detailed illustrated view of the circuit board shown in FIG. 6 is presented.

The circuit board 400 has a first circuit area 407 and a second circuit area 408. The first circuit area 407 and the second circuit area 408 contain the logic to locks onto images and tracks movements within a pre-determined specified parameter.

On either side of the first circuit area 407 and the second circuit area 408 is a motor 409 and gears 410. The motor 409 and the gear 410 are coupled by a coupling bar 411. The coupling bar 411 propagate the actions of the motor 409 to the gears 410 to adjust the tilt and angle for movement of the video camera 998.

The circuit board 400 further has a gear plate 412. The gear plate 412 couples to a main motor 413. The gear plate 412 receives information from the main motor 413 to adjust the Dynograph device 100.

The main motor 413 is configured to be on a middle portion 414 of the second end 415 of the circuit board 400. The main motor 413 is preferably a spindle with a shaft configured to provide a powered movement of the tilting or swiveling of the Dynograph device 100 and providing adjustments as determined by the logic of the circuit areas 407, 408.

Open areas 416, 417 complete the circuit board 400 and are useful for spacing the components, such as the main motor 413, first circuit area 407, second circuit area 408, gear plate 412, motor 409 and gears 410.

Figure 8:
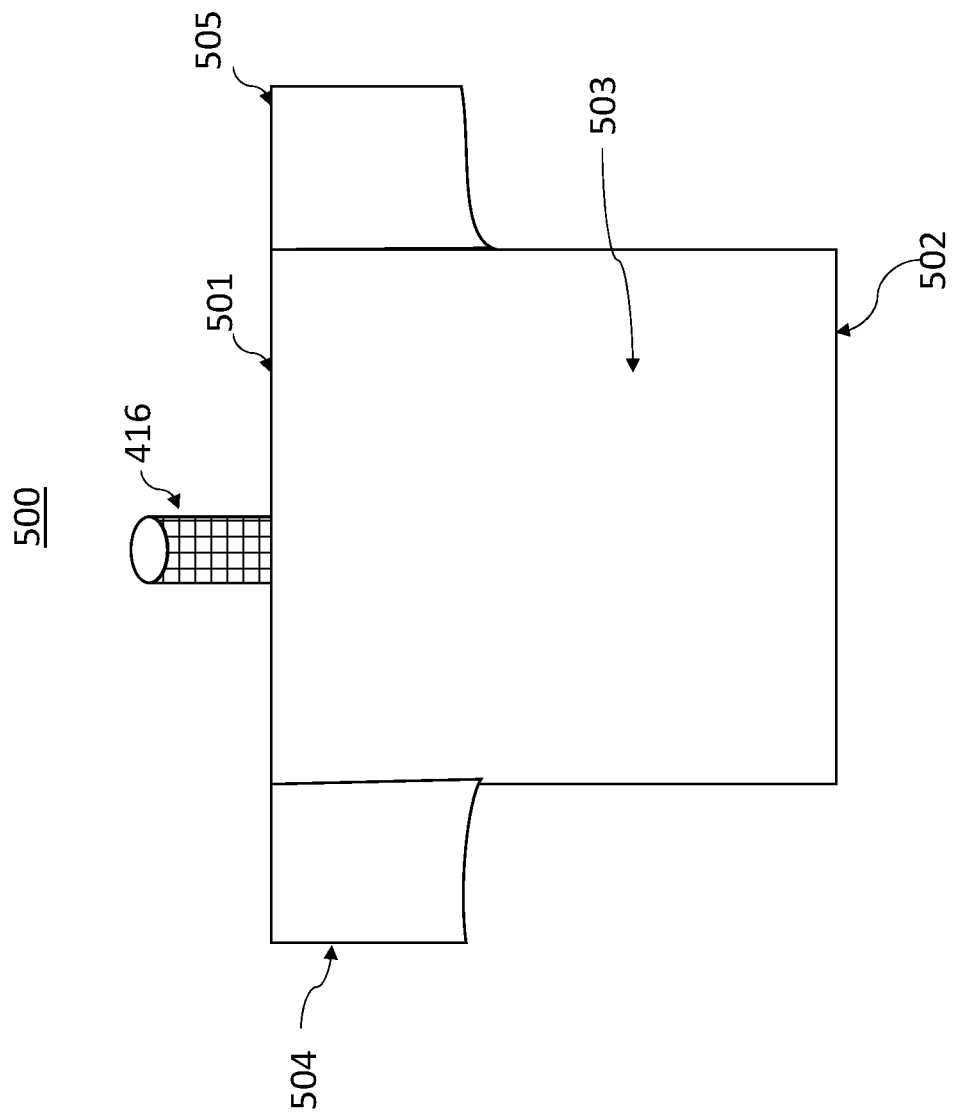
FIG. 8 is an illustrated view of a housing for a main motor for the circuit board shown in FIG. 7.

Referring to FIG. 8, an illustrated view of a housing 500 for a main motor 413 for the circuit board 400 shown in FIG. 7 is presented. The tripod 999 is also mounted to the housing 500.

The housing 500 has a first end 501, a second end 502, a first surface 503, a first wing 504 and a second wing 505.

The first surface 503 of the housing 500 has the main motor 413 (see FIG. 7) coupled to the first surface 503. This houses the main motor 413. A spindle 416 is coupled to the first end 501 of the housing 500. The spindle 416 drives rotation on the surface plate 200.

The first wing 504 and second wing 505 are useful for further mounting the main motor 413 to the circuit board 400 and to mount or couple the main motor 413 to the tripod 999. The housing 500 remains in a stable and stationary position.

The Dynograph device 100 is a motorized camera tripod 999 which interfaces an attached video camera 998 to allow for automatic subject tracing. Upon initial observation, it appears as a conventional camera tripod with three extendable and adjustable legs. However, after closer inspection, it can be seen that the Dynograph device 100 also provides motorized pan and tilt head that adjust the position of the attached video camera 998. This control module, powered by an attached battery or external power supply, uses smart logic to lock onto the movable portion of a video signal emanating from the video camera 998, such as a human presenter. Thus, as the person moves about the frame, the Dynograph device 100 automatically adjusts the position of the video camera 998 to keep the person within the same relative position. This movement is fluid and steady yielding finished videos that are on par with the best of professional films. The use of the Dynograph device 100 provides the ability to automatically pan and rotate the video camera 998 in a manner which is quick, easy and effective.

In the numbered clauses below, specific combinations of aspects and embodiments are articulated in a shorthand form such that (1) according to respective embodiments, for each instance in which a "component" or other such identifiers appear to be introduced (with "a" or "an," e.g.) more than once in a given chain of clauses, such designations may either identify the same entity or distinct entities; and (2) what might be called "dependent" clauses below may or may not incorporate, in respective embodiments, the features of "independent" clauses to which they refer or other features described above.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

The features described with respect to one embodiment may be applied to other embodiments or combined with or interchanged with the features of other embodiments, as appropriate, without departing from the scope of the present invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A Dynograph device for stabilizing and smoothing the motion flow of a video recording, the device comprising:
    a surface plate, the surface plate comprising:
        a top side, the top side having a plurality of grooves;
        a bottom side, the bottom side having first area, a second area, a third area, a mounting area and a USB cable port;
        the second area having one or more logic circuits;
        the third area having one or more logic circuits;
        the mounting area being for coupling to a tripod;
        the first area being for coupling to a video camera;
        the USB cable port for being coupled to a USB cable, wherein the USB cable being for relaying information;
        a plurality of holes;
    a circuit board, the circuit board comprising:
        a plurality of holes, the plurality of holes of the circuit board being aligned to be coupled with the plurality of holes of the surface plate;
        a logic area; and
        a motorized motor area.

2. The device of claim 1, wherein the motorized motor area further having a main motor.

3. The device of claim 1, wherein the circuit board further comprising a motor and one or more gears, wherein the motor being coupled to the one or more gears by a coupling bar.

4. The device of claim 1, wherein structural members of the device being made of an aluminum material.

5. The device of claim 1, wherein non-structural portions of the device being made of a plastic material.

6. The device of claim 1, wherein the main motor being to drive rotation for a specified angle.

7. The device of claim 6, wherein the angle being between zero degree and three-hundred sixty degrees (0°-360°).

8. The device of claim 1, wherein the device further comprising:
    a housing, the housing being for housing a spindle of the main motor.

9. The device of claim 8, wherein the spindle being for driving rotation driving rotation of the surface plate.

10. The device of claim 8, wherein the housing being a stationary position.

11. The device of claim 1, wherein the circuit board being coupled to the surface plate by screws.

* * * * *